United States Patent
Prokhorov et al.

(10) Patent No.: US 9,428,194 B2
(45) Date of Patent: Aug. 30, 2016

(54) SPLASH CONDITION DETECTION FOR VEHICLES

(71) Applicant: Toyota Motor Engineering & Manufacturing North America, Inc., Erlanger, KY (US)

(72) Inventors: Danil V. Prokhorov, Canton, MI (US); Junya Watanabe, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/566,998

(22) Filed: Dec. 11, 2014

(65) Prior Publication Data

US 2016/0167668 A1    Jun. 16, 2016

(51) Int. Cl.
| | |
|---|---|
| *G01C 22/00* | (2006.01) |
| *B60W 40/06* | (2012.01) |
| *G05D 1/00* | (2006.01) |
| *B60W 50/14* | (2012.01) |

(52) U.S. Cl.
CPC .............. *B60W 40/06* (2013.01); *B60W 50/14* (2013.01); *G05D 1/0088* (2013.01); *B60W 2550/14* (2013.01); *B60W 2550/308* (2013.01)

(58) Field of Classification Search
CPC .............. B60W 40/06; B60W 50/14; B60W 2550/14; B60W 2550/308; G05D 1/0088
See application file for complete search history.

(56) References Cited

U.S. PATENT DOCUMENTS

| | | | | |
|---|---|---|---|---|
| 5,341,344 | A | * 8/1994 | O'Brien | B60Q 9/006 340/904 |
| 5,502,433 | A | * 3/1996 | Breuer | B60R 16/0237 152/210 |
| 5,563,580 | A | * 10/1996 | Stephens | G08B 21/086 340/522 |
| 8,160,811 | B2 | 4/2012 | Prokhorov | |
| 8,260,482 | B1 | 9/2012 | Szybalski et al. | |
| 8,346,426 | B1 | 1/2013 | Szybalski et al. | |
| 8,352,110 | B1 | 1/2013 | Szybalski et al. | |
| 8,433,470 | B1 | 4/2013 | Szybalski et al. | |
| 2002/0198632 | A1* | 12/2002 | Breed | B60N 2/2863 701/1 |
| 2003/0160866 | A1* | 8/2003 | Hori | G01S 11/12 348/116 |

(Continued)

FOREIGN PATENT DOCUMENTS

| | | | | |
|---|---|---|---|---|
| DE | 102009055190 A1 | * 6/2011 | | B60W 40/06 |
| DE | 102010063792 A1 | 6/2012 | | |

(Continued)

OTHER PUBLICATIONS

"IF" defintion, Merriam-Webster's Collegiate Dictionary, 10th Edition, 1993, all pages.*

*Primary Examiner* — Calvin Cheung
(74) *Attorney, Agent, or Firm* — Christopher G. Darrow; Darrow Mustafa PC

(57) ABSTRACT

Arrangements relate to the operation of a vehicle, which can be an autonomous vehicle. A splash condition in a surrounding environment of the vehicle can be detected. An object near the vehicle can be detected. Further, it can be determined whether the detected object is passing the vehicle. Responsive to detecting a splash condition and determining that the object is passing the vehicle, a warning can be presented to an occupant of the vehicle.

20 Claims, 10 Drawing Sheets

(56) References Cited

U.S. PATENT DOCUMENTS

| | | | |
|---|---|---|---|
| 2004/0193347 A1* | 9/2004 | Harumoto | B60T 8/1755 701/45 |
| 2006/0212222 A1* | 9/2006 | Miyoshi | B60K 31/0008 701/301 |
| 2007/0040705 A1 | 2/2007 | Yoshioka et al. | |
| 2007/0272884 A1* | 11/2007 | Utida | B60S 1/0822 250/573 |
| 2007/0290822 A1* | 12/2007 | Gerber | B60Q 9/00 340/435 |
| 2009/0174575 A1* | 7/2009 | Allen | G07B 15/063 340/933 |
| 2009/0182505 A1* | 7/2009 | Ikeda | G01S 13/931 701/301 |
| 2009/0249878 A1* | 10/2009 | Faber | G01S 7/52006 73/627 |
| 2010/0138115 A1* | 6/2010 | Kageyama | B60R 21/0134 701/46 |
| 2010/0172542 A1* | 7/2010 | Stein | G06K 9/00798 382/103 |
| 2010/0259617 A1* | 10/2010 | Kawasaki | G06K 9/6292 348/148 |
| 2011/0010045 A1* | 1/2011 | Yopp | B60S 1/0818 701/36 |
| 2011/0234422 A1* | 9/2011 | Yamashita | B60Q 5/006 340/901 |
| 2012/0188374 A1* | 7/2012 | Taner | B60W 30/18163 348/148 |
| 2013/0038484 A1* | 2/2013 | Ohkado | G01S 13/345 342/70 |
| 2013/0147955 A1* | 6/2013 | Oosugi | G08G 1/096716 348/148 |
| 2014/0012455 A1* | 1/2014 | Neff | G05D 1/0231 701/25 |
| 2014/0081507 A1* | 3/2014 | Urmson | B60W 40/06 701/28 |
| 2014/0081573 A1 | 3/2014 | Urmson et al. | |
| 2014/0156133 A1* | 6/2014 | Cullinane | B60W 30/00 701/23 |
| 2014/0265980 A1* | 9/2014 | Kracker | G06K 9/00791 318/483 |
| 2015/0015383 A1* | 1/2015 | Sugano | B60T 7/22 340/435 |
| 2015/0046032 A1* | 2/2015 | Clarke | G01S 7/539 701/37 |
| 2015/0161881 A1* | 6/2015 | Takemura | G06T 7/0097 348/148 |
| 2015/0178588 A1* | 6/2015 | Fischer | G06K 9/4661 382/103 |
| 2015/0356869 A1* | 12/2015 | Young | G08G 1/0133 340/901 |
| 2015/0371095 A1* | 12/2015 | Hartmann | G06K 9/00791 348/148 |

FOREIGN PATENT DOCUMENTS

| | | | | |
|---|---|---|---|---|
| DE | 102013004271 A1 | | 9/2013 | |
| JP | S5853544 A | | 3/1983 | |
| JP | H03273499 A | | 12/1991 | |
| JP | 2009199154 A | * | 9/2009 | ............ G05D 1/02 |
| JP | 2014113410 A | | 6/2014 | |
| KR | 20110088247 A | | 8/2011 | |

* cited by examiner

SPLASH CONDITION DETECTION FOR VEHICLES

FIELD

The subject matter described herein relates in general to vehicles and, more particularly, to the operation of vehicles in environments in which reduced visibility conditions can develop.

BACKGROUND

Some motor vehicles are configured to operate in an autonomous mode to assist in the transportation of passengers from an origin to a destination. In such a mode, the vehicle uses computing systems to navigate a vehicle with reduced or no input from a driver. An autonomous vehicle typically includes sensors configured to detect information about the surrounding environment, such as the presence of other vehicles. The computing systems are configured to process the detected information to determine how to navigate the vehicle through the environment. Various environmental conditions can interfere with the operation of the sensors, which can reduce the operational performance of such vehicles.

SUMMARY

In one respect, the present disclosure is directed to a method of operating a vehicle. The method can include detecting a splash condition in a surrounding environment of the vehicle. The method can also include detecting an object near the vehicle. Further, the method can include determining whether the detected object is passing the vehicle. Responsive to detecting a splash condition and determining that the object is passing the vehicle, the method can include presenting a warning to an occupant of the vehicle.

In another respect, the present disclosure is directed to a system for a vehicle. The system includes a processor. The processor can be programmed to initiate executable operations. The executable operations can include detecting a splash condition in a surrounding environment of the vehicle. The executable operations can also include detecting an object near the vehicle. The executable operations can further include determining whether the detected object is passing the vehicle. Responsive to detecting a splash condition and determining the object is passing the vehicle, the executable operations can include presenting a warning to an occupant of the vehicle.

In a further respect, the present disclosure is directed to a computer program product for operating a vehicle in a present environment. The computer program product includes a computer readable storage medium having program code embodied therewith. The program code can be executable by a processor to perform a method. The method can include detecting a splash condition in a surrounding environment of the vehicle. The method can also include detecting an object near the vehicle. Further, the method can include determining whether the object is passing the vehicle. Responsive to detecting a splash condition and determining that the object is passing the vehicle, the method can include presenting a warning to an occupant of the vehicle.

In another respect, the present disclosure is directed to a method of operating a vehicle operating in an autonomous mode. The method can include detecting a splash condition in a surrounding environment of the vehicle. The method can also include detecting a forward object or a rearward object in the same travel lane as the vehicle. The method can further include detecting an object traveling in a travel lane that is adjacent to the travel lane in which the vehicle is located. The method can also include determining whether the object is passing the vehicle. Responsive to detecting a splash condition and determining the object is passing the vehicle, the method can include adjusting the distance between the vehicle and the forward object and/or the rearward object. Alternatively or in addition, the method can include adjusting the distance between the vehicle and the object passing the vehicle.

In yet another respect, the present disclosure is directed to a system for operating a vehicle operating in an autonomous mode. The system includes a processor. The processor can be programmed to initiate executable operations. The executable operations can include detecting a splash condition in a surrounding environment of the vehicle. The executable operations can also include detecting whether a forward object or a rearward object is located in the same travel lane as the vehicle. Further, the executable operations can include detecting an object traveling in a travel lane that is adjacent to the travel lane in which the vehicle is located. Still further, the executable operations can include determining whether the object is passing the vehicle. Responsive to detecting a splash condition and determining the object is passing the vehicle, the executable operations can include adjusting the distance between the vehicle and the forward object and/or the rearward object. Alternatively or in addition, the executable operations can include adjusting the distance between the vehicle and the object passing the vehicle.

DETAILED DESCRIPTION

Figure 1:
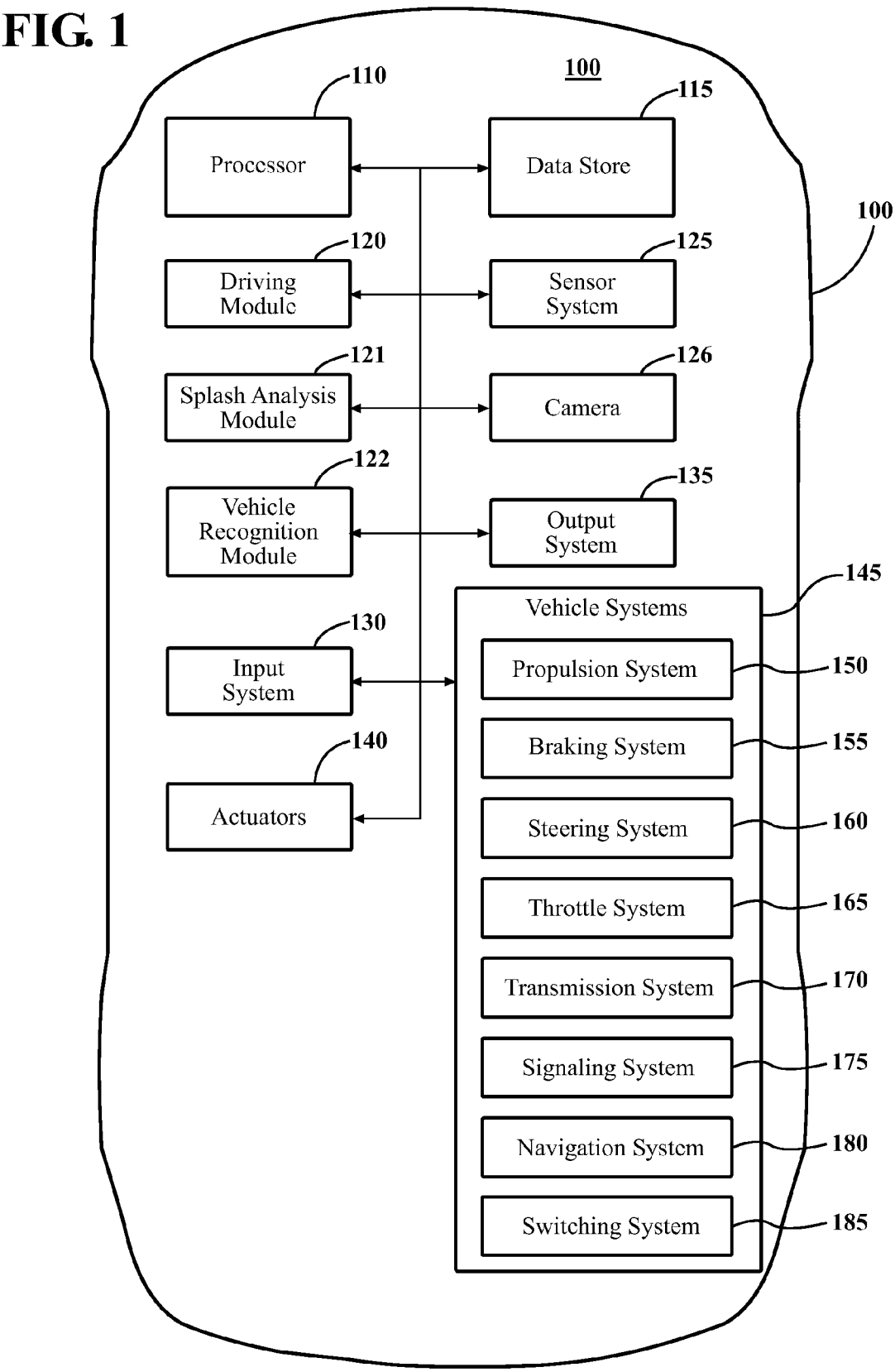
FIG. 1 is an example of a vehicle including a splash condition detection system.

This detailed description relates to the operation of a vehicle located in an environment in which a splash condition may be present. More particularly, arrangements described herein relate to situations in which a splash condition is detected and another object (e.g. another vehicle) is determined to be passing the present vehicle in an adjacent travel lane. Responsive to such detection and determination, one or more actions can occur. As an example, in one or more arrangements, a warning can be presented. The present detailed description relates to systems, methods and computer program products that incorporate such features. In at least some instances, such systems, methods and computer program products can, among other things, facilitate the safety of the passengers of the vehicle and/or minimize low visibility driving conditions or events from developing.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-10, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some implementations, the vehicle 100 may be a watercraft, an aircraft or any other form of motorized transport.

In some arrangements, the vehicle 100 can be an autonomous vehicle. As used herein, "autonomous vehicle" means a vehicle that is configured to operate in an autonomous mode using one or more computing systems to navigate and/or maneuver a vehicle along a travel route with minimal or no input from a human driver. In some arrangements, the vehicle 100 can be a manual vehicle. "Manual vehicle" means a vehicle that is configured to operate in a manual mode in which a majority of the navigation and/or maneuvering of a vehicle along a travel route is performed by a human driver. In some arrangements, the vehicle 100 can be configured to be selectively switched between an autonomous mode and a manual mode. Such switching can be implemented in any suitable manner, now known or later developed.

The vehicle 100 can include various elements. Some of the possible elements are shown in FIG. 1 will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, the vehicle 100 may not include one or more of the elements shown in FIG. 1. Further, while the various elements are shown as being located within the vehicle 100 in FIG. 1, it will be understood that one or more of these elements can be located external to vehicle 100. Further, the elements shown may be physically separated by any distance, including large distances.

The vehicle 100 can include one or more processors 110. "Processor" means any component or group of components that are configured to execute any of the processes described herein or any form of instructions to carry out such processes or cause such processes to be performed. The processor 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, the processor 110 can be a main processor of the vehicle 100. For instance, the processor 110 can be an engine control unit.

The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be operatively connected to the processor 110 for use thereby. The term "operatively connected," as used throughout this description, can include direct or indirect connections, including connections without direct physical contact.

The vehicle 100 can include a driving module 120. If the vehicle 100 is an autonomous vehicle, then the driving module 120 can be an autonomous driving module. The driving module 120 can be implemented as computer readable program code that, when executed by a processor, implement one or more of the various processes described herein. The driving module 120 and/or the data store 115 can be components of the processor 110, or the driving module 120 and/or the data store 115 can be executed on and/or distributed among other processing systems to which the processor 110 is operatively connected.

The driving module 120 can include instructions (e.g., program logic) executable by the processor 110. Such instructions can include instructions to execute various vehicle functions and/or to transmit data to, receive data from, interact with, and/or control the vehicle or one or more systems thereof (e.g. one or more of vehicle systems 145). Alternatively or in addition, the data store 115 may contain instructions.

The vehicle 100 can include a splash analysis module 121. The splash analysis module 121 can be implemented as computer readable program code that, when executed by a processor, implement one or more of the various processes described herein. The splash analysis module 121 can be a component of the processor 110 and/or the driving module 120. The splash analysis module 121 can be executed on and/or distributed among other processing systems to which the processor 110 is operatively connected.

The splash analysis module 121 can be configured to determine whether at least a portion of the vehicle 100 will be splashed with a substance. More particularly, the splash analysis module 121 can be configured to determine whether at least a portion of the vehicle 100 will be splashed with a substance scattered by a detected object (e.g. another vehicle). Still more particularly, the splash analysis module 121 can be configured to determine when at least a portion of the vehicle 100 will be splashed with a substance scattered by a passing object (e.g. a passing vehicle) that is located in the same travel lane as the substance. The travel lane can be adjacent to the current travel lane of the vehicle 100. As used herein, the phrases "passing object" and "detected object is passing the vehicle" mean that an object is passing or attempting to pass the present vehicle and is located in a travel lane substantially adjacent to the current travel lane of the present vehicle. The vehicle 100 may be referred to herein as the "present vehicle." The passing object may be traveling in the substantially the same direction or in a different direction (e.g. substantially the opposite direction) as the present vehicle. The passing object may or may not be traveling substantially parallel to the present vehicle. As used herein, the term "substantially" includes exactly the term it modifies and slight variations therefrom. Thus, the term "substantially parallel" means exactly parallel and slight variations therefrom.

"Splash" means to cause something (e.g. a substance, fluid, etc.) to scatter in a flying mass. The splash analysis module 121 can be configured to determine whether the passing vehicle will drive through the splash condition. The splash analysis module 121 can be configured to predict and/or determine the size and/or direction of a splash resulting from the passing vehicle traveling through the splash condition. The splash analysis module 121 can be configured to predict and/or determine whether the vehicle 100 will be at least partially contacted or covered with splash caused by the passing vehicle.

Such determinations and/or predictions can be made in any suitable manner. For instance, the splash analysis module 121 can make such determinations and/or predictions based on one or more of the following data inputs: the length of the present vehicle (see Lpv in FIGS. 2-3), the length of the passing vehicle (see Lv in FIGS. 2-3) or other object, the presence of a splash condition, the size of the splash condition, the identity of the substance of the splash condition, the distance between the present vehicle and the splash condition (see L1 in FIGS. 2-3), the distance between the passing vehicle and the splash condition (see L2 in FIGS. 2-3), the speed of the present vehicle 100, the speed of the passing vehicle, the relative distance between the present vehicle 100 and a passing vehicle, the relative speed of the present vehicle 100 and the passing vehicle, the direction of travel of the present vehicle 100, the direction of travel of the passing vehicle, the size of the passing vehicle, the relative size of the passing vehicle, and/or other input.

The vehicle 100 can include a sensor system 125. The sensor system 125 can include one or more sensors. "Sensor" means any device, component and/or system that can detect, determine, assess, measure, quantify and/or sense something, directly or indirectly. In arrangements in which the sensor system 125 includes a plurality of sensors, the sensors can work independently from each other or one or more of the sensors can work in combination with each other. The sensor system 125 and/or the one or more sensors can be operatively connected to the processor 110, the data store 115, the driving module 120 and/or other element of the vehicle 100.

The sensor system 125 can include any suitable type of sensor. For example, the sensor system 125 can include one or more sensors configured to detect, determine, assess, measure, quantify and/or sense information about the vehicle 100. Alternatively or in addition, the sensor system 125 can include one or more sensors configured to detect, determine, assess, measure, quantify and/or sense information about an environment in which the vehicle 100 is located, including information about objects in the environment. Such objects may be stationary object or moving objects. Alternatively or in addition to one or more of the above examples, the sensor system 125 can include one or more sensors configured to detect, determine, assess, measure, quantify and/or sense the location of the vehicle 100, other vehicles and/or other objects in the environment. Various examples of these and other types of sensors will be described herein. It will be understood that the embodiments are not limited to the particular sensors described.

The sensor system 125 can include one or more sensors configured to detect, determine, assess, measure, quantify and/or sense position and orientation changes of the vehicle 100, such as, for example, based on inertial acceleration. The sensor system 125 can include one or more sensors configured to detect, determine, assess, measure, quantify and/or sense the speed of the vehicle 100. In one or more arrangements, the sensor system 125 can include accelerometers, gyroscopes and/or other suitable sensors. The sensor system 125 can include sensors that can monitor one or more internal systems of the vehicle (e.g., an $O_2$ monitor, a fuel gauge, an engine oil temperature, coolant temperature, etc.). The sensor system 125 can include one or more sensors configured to detect, determine, assess, measure, quantify and/or sense one or more user inputs. As an example, the sensor system can include one or more sensors configured to detect, determine, assess, measure, quantify and/or sense whether a driver grabs or grips a steering wheel or other portion of the vehicle 100.

The sensor system 125 can include one or more sensors configured to, directly or indirectly, detect, determine, assess, measure, quantify and/or sense information about weather in a location, area or region in which the vehicle 100 is currently located or along a travel route. The one or more sensors can be configured to detect, determine, assess, measure, quantify and/or sense weather data in real-time. As used herein, the term "real-time" means a level of processing responsiveness that a user or system senses as sufficiently immediate for a particular process or determination to be made, or that enables the processor to keep up with some external process.

For instance, the weather sensors can be operable to detect, determine, assess, measure, quantify and/or sense whether there is rain, snow, ice, slush, storms and/or other weather conditions in the environment outside of the vehicle. The weather sensors, the processor 105 and/or the splash analysis module 121 can be configured to identify the substance. Alternatively or in addition, the weather sensors can be operable to detect, determine, assess, measure and/or sense whether the road is wet and/or whether there is a body of water or other fluid on the road. The weather sensors can be operable to detect, determine, assess, measure and/or sense the relative amount of a particular weather condition (e.g. heavy rain v. light rain).

The sensor system 125 or other suitable element of the vehicle 100 can be configured to obtain weather information or data from any suitable source of weather data, such as a weather database, a weather news source, an online weather database, a weather-related website, the radio or other suitable source. Such data can include present, past and/or future weather data. Future weather data includes predicted conditions based on one or more factors. The weather data can include prevailing weather conditions and/or road conditions (e.g. wet roads, snow on the roads, etc.).

In one or more arrangements, the sensor system 125 can include one or more sensors configured to detect, determine, assess, measure, quantify and/or sense objects in the environment in which the vehicle is located. The sensor system 125 can be configured to detect, determine, assess, measure, quantify and/or sense the length, speed and/or heading of such objects. For instance, the sensor system 125 can detect, determine, assess, measure, quantify and/or sense the presence of other vehicles. The sensor system can detect, determine, assess, measure, quantify and/or sense distance between the present vehicle and a splash condition and/or the distance between a detected other vehicle and the splash condition. The sensor system 125 can be configured to detect, determine, assess, measure, quantify and/or sense the distance between the present vehicle and a forward vehicle or a rearward vehicle.

The sensor system 125 can include one or more sensors configured to detect, determine, assess, measure, quantify and/or sense objects in the environment in which the vehicle is located using ultrasound. For instance, one or more ultrasound sensors can be used to detect the presence of a splash condition (e.g. a pool of water on a road) based on the intensity of a reflected ultrasonic wave.

The sensor system 125 can include one or more sensors configured to detect, determine, assess, measure, quantify and/or sense objects in the environment in which the vehicle is located using radio signals (e.g. RADAR based sensors). In some arrangements, the one or more sensors can be configured to detect, determine, assess, measure, quantify and/or sense the length, speed and/or heading of such objects.

The sensor system 125 can include one or more sensors can be configured to detect, determine, assess, measure, quantify and/or sense objects in the environment in which the vehicle is located using lasers. For instance, the sensors can be or included as part of a laser rangefinder or a LIDAR. Such devices can include a laser source and/or laser scanner configured to emit a laser and a detector configured to detect reflections of the laser. The laser rangefinder or LIDAR may be configured to operate in a coherent or an incoherent detection mode. In some arrangements, the one or more laser-based sensors can be configured to detect, determine, assess, measure, quantify and/or sense the length, speed and/or heading of such objects.

The sensor system 125 can include a camera 126. "Camera" is defined as any device, component, and/or system that can capture an image. The camera 126 can include a lens and an image capture element. The image capture element can be any suitable type of image capturing device or system, including, for example, an area array sensor, a Charge Coupled Device (CCD) sensor, a Complementary Metal Oxide Semiconductor (CMOS) sensor, a linear array sensor, a CCD (monochrome). The image capturing element may capture images in any suitable wavelength on the electromagnetic spectrum. The image capturing element may capture color images and/or grayscale images.

Alternatively or in addition to the above, the sensor system 125 can include other types of sensors. The processor 110 can be operable to control movements of one or more of the sensors of the sensor system 125. It should be noted that any of the sensors described herein can be provided in any suitable location with respect to the vehicle 100. For instance, one or more sensors can be located within the vehicle and/or one or more sensors can be located on or exposed to the exterior of the vehicle.

In some arrangements, the sensor system 125, the processor 110, the driving module 120 and/or the splash analysis module 121 can be configured to detect, determine, assess, measure, quantify and/or sense, directly or indirectly, one or more dimensions of a detected object. For instance, based on data received from one or more sensors of the sensor system 125, a direct measurement of one or more dimensions of a detected object can be determined. Examples of dimensions that can be detected, determined, assessed, measured, quantified and/or sensed, directly or indirectly, include length, width and/or height.

In some arrangements, the sensor system 125, the processor 110, the driving module 120 and/or the splash analysis module 121 can be configured to detect, determine, assess, measure, quantify and/or sense, directly or indirectly, a relative size of at least a portion of a detected object. In this regard, a "large object" is any object that has one or more dimensions greater than a predetermined dimension or is otherwise presumed to be "large" based on one or more factors. A "non-large object" is any object that has one or more dimensions less than a predetermined dimension or is otherwise presumed to be non-large based on one or more factors.

The relative size of a detected object can be determined in any suitable manner. For instance, a detected dimension of the object (e.g. length, width and/or height) can be compared to a predetermined dimension. The predetermined dimension can have any suitable value. In one or more arrangements, if the detected dimension is greater than the predetermined dimension, the object can be determined, classified and/or considered to be a large object. Such a comparison, determination, classification and/or consideration can be made by, for example, the processor 110, the driving module 120 and/or the splash analysis module 121. If the detected dimension is less than or equal to the predetermined dimension, the object can be determined, classified or considered to be a non-large object.

In one or more arrangements, the predetermined dimension can be a predetermined length. In such arrangements, the relative size of a detected object can be determined with respect to the predetermined length. For example, the length of an object can be detected. The detected length of the object can be compared to a predetermined length. The predetermined length can be any suitable length. In one or more arrangements, the predetermined length can be substantially equal to the length of the present vehicle 100. In one or more arrangements, such as in the case of smaller vehicles, the predetermined length can be a value that is greater than the length of the present vehicle 100. In some arrangements, if the detected length is greater than the predetermined length, the object can be determined, classified and/or considered to be a large object. If the detected length is less than or equal to the predetermined length, the object can be determined, classified and/or considered to be a non-large object.

Alternatively or in addition, the relative size of the object can be determined based on one or more inputs. For instance, the sensor system 125 can be configured to detect, determine, assess, measure, quantify and/or sense, directly or indirectly, the number of wheels or tires on a side of an object. Based on the number of detected wheels or tires, the processor 110, the driving module 120 and/or the splash analysis module 121 can determine whether the object is a large object. For instance, if more than two wheels are detected on a side of a surrounding object, then it can be determined to be a large object (e.g. a truck).

Alternatively or in addition, the sensor system 125, the processor 110, the driving module 120 and/or the splash analysis module 121 can be configured to detect, determine, assess, measure, quantify and/or sense, directly or indirectly, the size of the wheels or tires of an object. As an example, the wheels or tires of the object can have an associated diameter and/or radius. The size of the wheels or tires can be determined by a direct measurement of a diameter or radius of a wheel or tire. In some arrangements, the detected diameter or radius of the tires or wheels can be compared to a predetermined diameter or radius. The predetermined diameter or radius can be any suitable value. In one or more arrangements, the predetermined diameter or radius can be substantially equal to the diameter or radius of the present vehicle 100. In one or more arrangements, such as in the case of vehicles with smaller wheels or tires, the predetermined diameter or radius can be a value that is greater than the diameter or radius of the tires or wheels of the present vehicle 100. If the detected diameter or radius is greater than the predetermined diameter or radius, the object can be determined to be a large or long object. If the detected diameter or radius is less than or equal to the predetermined diameter or radius, the object can be determined, classified and/or considered to be a non-large object. Such a comparison and/or determination can be made by, for example, the processor 110, the driving module 120 and/or the splash analysis module 121.

In some arrangements, the vehicle 100 can include a vehicle recognition module 122. The vehicle recognition module 122 can include and/or have access to a vehicle image database (not shown). The vehicle image database can include one or more images of a plurality of different vehicles. The images may be of one or more portions of the exterior of at least a portion of a plurality of different vehicles. For instance, the images can be of at least a portion of a vehicle. The images can be provided in any suitable format. The vehicle image database can be located on the vehicle 100, such as in the data store 115, or it can be located in a source external to the vehicle 100.

As an example, the vehicle recognition module 122 can also include any suitable vehicle recognition software. The vehicle recognition software can analyze an image captured by the camera 126. The vehicle recognition software can query the vehicle image database for possible matches. For instance, images captured by the camera 126 can be compared to any images in the vehicle image database for possible matches. Alternatively or in addition, measurements or other aspects of an image captured by the camera 126 or the other sensor(s) can be compared to measurements or other aspects of any images in the vehicle image database. The vehicle recognition module 122 can assume that the detected object is a particular type of vehicle if there is a match between the captured image and an image in the vehicle database.

"Match" or "matches" means that an image or other information collected by the sensor system and one or more of the images in the vehicle database are substantially identical. For instance, the an image or other information collected by the sensor system and one or more of the images in the vehicle database can match within a predetermined probability (e.g., at least about 85%, at least about 90%, at least about 95% or greater) or confidence level.

The vehicle 100 can include an input system 130 for receiving input from a vehicle occupant (e.g. a driver or a passenger). Any suitable input system 130 can be used, including, for example, a keypad, display, touch screen, multi-touch screen, button, joystick, mouse, trackball, microphone and/or combinations thereof.

The vehicle 100 can include an output system 135 for presenting information to the user. The output system 135 can include a display. The display can be any suitable type of display. In one or more arrangements, the display can be a touch screen display or a multi-touch display. The touch screen can allow a user to engage or interact with one or more displayed elements, such as a graphical user interface (GUI), and/or other applications running on any vehicle system, including any of those described herein, through contact with the display. For example, a user may make selections and/or move a cursor by simply touching the display via a finger or stylus.

Alternatively or in addition, the output system 135 may include a microphone, earphone and/or speaker. Some components of the vehicle 100 may serve as both a component of the input system 130 and a component of the output system 135.

The vehicle 100 can include one or more vehicle systems 145. Various examples of the one or more vehicle systems 145 are shown in FIG. 1. However, the vehicle 100 can include more, fewer, or different systems. It should be appreciated that although particular vehicle systems are separately defined, each or any of the systems or portions thereof may be otherwise combined or segregated via hardware and/or software within the vehicle 100.

The vehicle 100 can include a propulsion system 150. The propulsion system 150 can include one or more mechanisms, devices, elements, components, systems, and/or combinations thereof, now known or later developed, configured to provide powered motion for the vehicle. The propulsion system 150 can include an engine and an energy source.

The engine can be any suitable of engine or motor, now known or later developed. For instance, the engine can be an internal combustion engine, an electric motor, a steam engine, and/or a Stirling engine, just to name a few possibilities. In some embodiments, the propulsion system could include a plurality of engine types. For instance, a gas-electric hybrid vehicle can include a gasoline engine and an electric motor.

The energy source can be any suitable source of energy that can be used to at least partially power the engine. The engine can be configured to convert the energy source into mechanical energy. Examples of energy sources include gasoline, diesel, propane, other compressed gas-based fuels, ethanol, solar panels, batteries, and/or other sources of electrical power. Alternatively or in addition, the energy source can include fuel tanks, batteries, capacitors, and/or flywheels. In some embodiments, the energy source can be used to provide energy for other systems of the vehicle.

The vehicle 100 can include wheels or tires. Any suitable type of wheels or tires can be used. In one or more arrangements, the wheels or tires of the vehicle can be configured to rotate differentially with respect to other wheels or tires. The wheels or tires can be made of any suitable material.

The vehicle 100 can include a braking system 155. The braking system 155 can include one or more mechanisms, devices, elements, components, systems, and/or combinations thereof, now known or later developed, configured to decelerate the vehicle. As an example, the braking system 155 can use friction to slow the wheels/tires. The braking system 155 can convert the kinetic energy of the wheels/tires to electric current.

Further, the vehicle 100 can include a steering system 160. The steering system 160 can include one or more mechanisms, devices, elements, components, systems, and/or combinations thereof, now known or later developed, configured to adjust the heading of the vehicle 100.

The vehicle 100 can include a throttle system 165. The throttle system 165 can include one or more mechanisms, devices, elements, components, systems, and/or combinations thereof, now known or later developed, configured to control the operating speed of an engine/motor of the vehicle 100 and, in turn, the speed of the vehicle 100.

The vehicle 100 can include a transmission system 170. The transmission system 170 can include one or more mechanisms, devices, elements, components, systems, and/or combinations thereof, now known or later developed, configured to transmit mechanical power from the engine/motor of the vehicle 100 to the wheels/tires. For instance, the transmission system 170 can include a gearbox, clutch, differential, drive shafts, and/or other elements. In arrangements where the transmission system 170 includes drive shafts, the drive shafts can include one or more axles that are configured to be coupled to the wheels/tires.

The vehicle 100 can include a signaling system 175. The signaling system 175 can include one or more mechanisms, devices, elements, components, systems, and/or combinations thereof, now known or later developed, configured to provide illumination for the driver of the vehicle and/or to provide information with respect to one or more aspects of the vehicle. For instance, the signaling system 175 can provide information regarding the vehicle's presence, position, size, direction of travel, and/or the driver's intentions regarding direction and speed of travel. For instance, the signaling system 175 can include headlights, taillights, brake lights, hazard lights and turn signal lights.

The vehicle 100 can include a navigation system 180. The navigation system 180 can include one or more mechanisms, devices, elements, components, systems, applications and/or combinations thereof, now known or later developed, configured to determine the geographic location of the vehicle 100 and/or to determine a travel route for the vehicle 100.

The navigation system 180 can include one or more mapping applications to determine a travel route for the vehicle 100. For instance, a user may input an origin and a destination. The mapping application can determine one or more suitable travel routes between the origin and the destination. A travel route may be selected based on one or more parameters (e.g. shortest travel distance, shortest amount of travel time, etc.). In some arrangements, the navigation system 180 can be configured to update the travel route dynamically while the vehicle 100 is in operation.

The navigation system 180 can include a global positioning system, a local positioning system or a geolocation system. The navigation system 180 can be implemented with any one of a number of satellite positioning systems, such as the United States Global Positioning System (GPS), the Russian Glonass system, the European Galileo system, the Chinese Beidou system, or any system that uses satellites from a combination of satellite systems, or any satellite system developed in the future, including the planned Chinese COMPASS system and the Indian Regional Navigational Satellite System. Further, the navigation system 180 can use Transmission Control Protocol (TCP) and/or a Geographic information system (GIS) and location services.

The navigation system 180 may include a transceiver configured to estimate a position of the vehicle 100 with respect to the Earth. For example, navigation system 180 can include a GPS transceiver to determine the vehicle's latitude, longitude and/or altitude. The navigation system 180 can use other systems (e.g. laser-based localization systems, inertial-aided GPS, and/or camera-based localization) to determine the location of the vehicle 100.

Alternatively or in addition, the navigation system 180 can be based on access point geolocation services, such as using the W3C Geolocation Application Programming Interface (API). With such a system, the location of the vehicle 100 can be determined through the consulting of location information servers, including, for example, Internet protocol (IP) address, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs. Thus, it will be understood that the specific manner in which the geographic position of the vehicle is determined will depend on the manner of operation of the particular location tracking system used.

In one or more arrangements, the vehicle 100 can include a switching system 185. The switching system 185 can include one or more mechanisms, devices, elements, components, systems, applications and/or combinations thereof, now known or later developed, configured to switching the operational mode from an autonomous mode to a manual mode and/or from a manual mode to an autonomous mode. In some arrangements, the vehicle 100 can be configured to be selectively switched between an autonomous mode and a manual mode. Such switching can be implemented in any suitable manner, now known or later developed. The switching system 185 can be realized in hardware or a combination of hardware and software.

The processor 110, the driving module 120 and/or the splash analysis module 121 can be operatively connected to communicate with the various vehicle systems 145 and/or individual components thereof. For example, returning to FIG. 1, the processor 110, the driving module 120 and/or the splash analysis module 121 can be in communication to send and/or receive information from the various vehicle systems 145 to control the movement, speed, maneuvering, heading, direction, etc. of vehicle 100. The processor 110, the driving module 120 and/or the splash analysis module 121 may control some or all of these vehicle systems 145 and, thus, may be partially or fully autonomous.

The processor 110, the driving module 120 and/or the splash analysis module 121 may be operable to control the navigation and/or maneuvering of the vehicle 100 by controlling one or more of the vehicle systems 145 and/or components thereof. For instance, when operating in an autonomous mode, the processor 110, the driving module 120 and/or the splash analysis module 121 can control the direction and/or speed of the vehicle 100. The processor 110, the driving module 120 and/or the splash analysis module 121 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 140. The actuators 140 can be any element or combination of elements operable to modify, adjust and/or alter one or more of the vehicle systems 145 or components thereof to responsive to receiving signals or other inputs from the processor 110, the driving module 120 and/or the splash analysis module 121. Any suitable actuator can be used. For instance, the one or more actuators 140 can include motors, pneumatic actuators, hydraulic pistons, relays, solenoids, and/or piezoelectric actuators, just to name a few possibilities.

Figure 2:
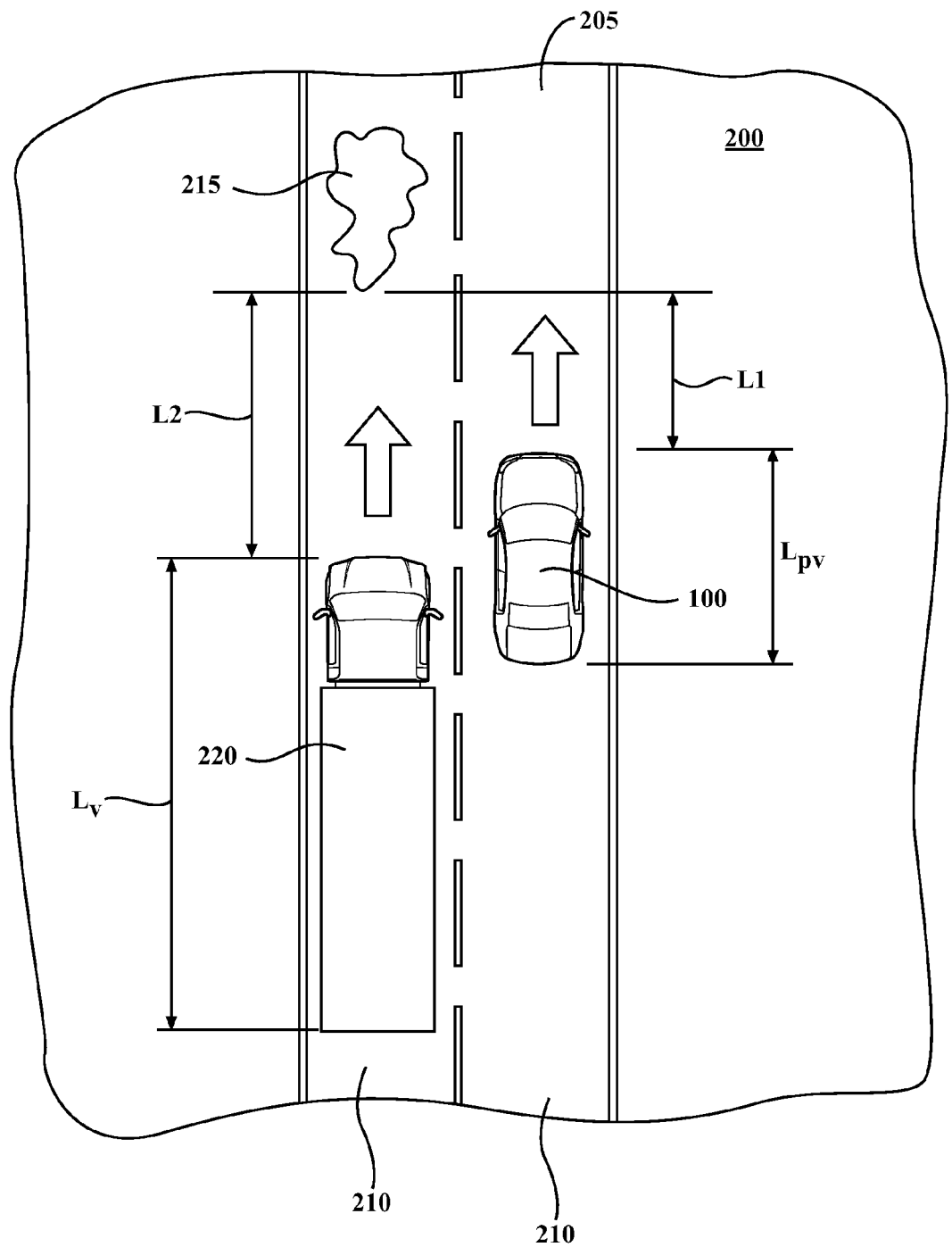
FIG. 2 is an example of a present vehicle operating in an environment in which a splash condition is present and in which another vehicle is passing the present vehicle in substantially the same travel direction as the present vehicle.
Figure 3:
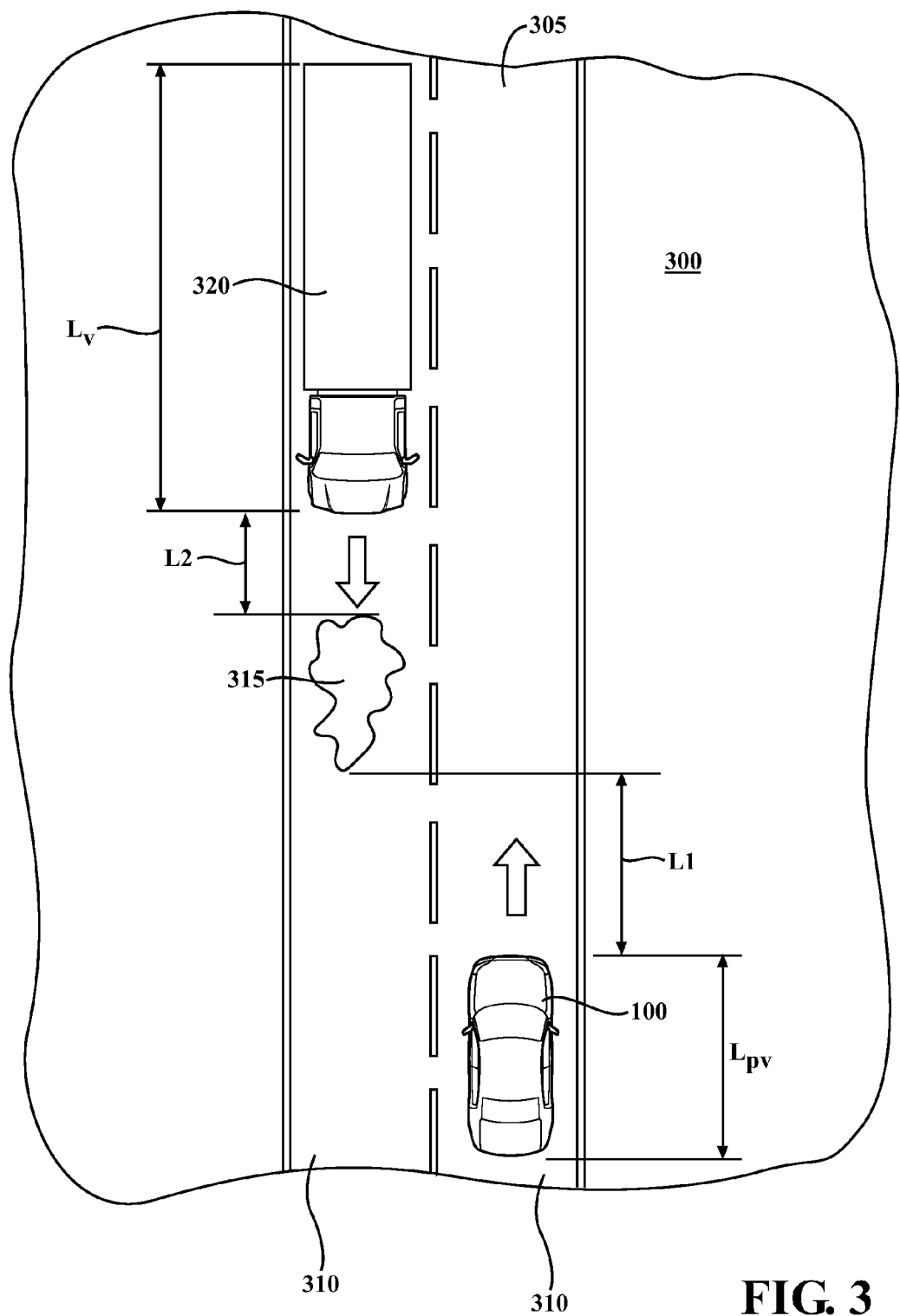
FIG. 3 is an example of a present vehicle operating in an environment in which a splash condition is present and in which another vehicle is passing the present vehicle in substantially the opposite travel direction as the present vehicle.

Now that the various, one example of an environment 200 in which the vehicle 100 can operate is shown in FIGS. 2-3. Again, the vehicle 100 may be referred to herein as the "present vehicle." The vehicle 100 can be traveling on a road 205 (FIG. 2), 305 (FIG. 3). "Road" means a thoroughfare, route, path or way between two places and upon which a vehicle can travel. The road 205, 305 may be paved or otherwise improved to facilitate travel by a vehicle thereon. In some instances, the road 205, 305 may be unpaved or undeveloped. The road 205 may be a public road or a private road. The road 205, 305 may be designated for one way travel (e.g. a one way street), or the road 205, 305 can be designated for two way travel. The road 205, 305 can include or be a part of one or more bridges, tunnels, supporting structures, junctions, crossings, interchanges, and toll roads. The road 205, 305 can include a shoulder of a road.

The road 205, 305 can include one or more travel lanes 210 (FIG. 2), 310 (FIG. 3). A "travel lane" is a portion of a road that is designated for use by a single line of vehicles and/or a portion of a road that is currently being used by a single line of vehicles. In some instances, the one or more travel lanes 210, 310 can be designated by markings on the road 205, 305 or in any other suitable manner. In some instances, the one or more travel lanes 210, 310 may not be marked.

FIGS. 2-3 show an example in which the road 205, 305 includes two adjacent travel lanes 210, 310. "Adjacent travel lanes" means two travel lanes that are located proximate each other. The adjacent travel lanes can be substantially parallel to each other. The adjacent travel lanes may directly abut each other. As an example, the adjacent travel lanes can be defined on the same paved road, but are separated by lane markings. Alternatively, there may be some spacing between the adjacent travel lanes if, despite the spacing, it is determined that an object passing through a splash condition in such an adjacent travel lane would cause splash to reach the travel lane of the present vehicle. In some instances, the spacing can be defined by a grassy area, a median, a barrier, another travel lane, etc. The adjacent travel lane may be located on a driver side of the vehicle 100 or a passenger side of the vehicle 100.

However, it will be understood that arrangements described herein are not limited to roads having two travel lanes. Indeed, arrangements described herein can be used in connection with roads having any number of travel lanes. Further, it should be noted that the vehicles in adjacent travel lanes may travel in the same direction, or the vehicles in adjacent travel lanes may travel in opposite directions. FIG. 2 shows an example in which a vehicle (e.g. truck 220) is traveling in substantially the same direction as the present vehicle 100. FIG. 3 shows an example in which a vehicle (e.g. truck 320) is traveling in substantially the opposite direction as the present vehicle 100.

The environment 200 (FIG. 2), 300 (FIG. 3) can include a splash condition 215, 315. As used herein, "splash condition" means the presence of any substance in a travel lane that when driven over by a vehicle or other object, will cause at least a portion of the substance to scatter in a flying mass. Examples of a splash condition include rain, a pool of water or other liquid substance, snow, slush, sand, dirt, dust. The splash condition may be in a localized area (e.g. a pool of water in one or more travel lanes), or it may be a general condition of the area (e.g. rain).

As noted above, the vehicle 100 can be configured to detect objects surrounding the vehicle 100 in the environment 200, 300. The surrounding object can be located in any direction with respect to the vehicle 100. The surrounding objects can include one or more other vehicles. The other vehicles may be autonomous vehicles or non-autonomous vehicles or any combination of autonomous and non-autonomous vehicles. For instance, the surrounding objects can include one or more forward vehicles, one or more rearward vehicles, and/or one or more adjacent vehicles. "Forward vehicle" means a vehicle that is located in front of and in the same lane or substantially the same lane as the present vehicle and traveling in substantially the same direction. "Rearward vehicle" means a vehicle that is located behind and in the same lane or substantially the same lane as the present vehicle and traveling in substantially the same direction. "Adjacent vehicle" means a vehicle that is located in an adjacent travel lane. An adjacent vehicle can be traveling in substantially the same direction as the present vehicle and/or and adjacent vehicle can be traveling in substantially the opposite direction as the present vehicle. An adjacent vehicle can be located on the driver side of the vehicle, or an adjacent vehicle can be located on the passenger side of the vehicle. In some instances, one or more of the other vehicles may or may not be moving. For instance, there may be one or more parked, stopped, and/or disabled vehicles.

The surrounding objects can include non-vehicle objects. For instance, the non-vehicle objects can include people, animals, signs, and/or other objects. The non-vehicle objects can be stationary, or they can be moving.

In some arrangements, the surrounding objects can include all objects detected by the sensor system 125 within the range of the sensors. In some arrangements, the surrounding objects can be a subset of the objects detected by the sensor system 125, such as those objects that are detected to be within a predetermined distance from the vehicle 100. For instance, objects that are located beyond the predetermined distance can be ignored or otherwise filtered and thus effectively ignored.

Now that the various potential systems, devices and/or components of the vehicle 100 and the environment 200, 300 in which the vehicle 100 may operate have been described, various methods of operating a vehicle when a splash condition is detected will now be described.

Figure 4:
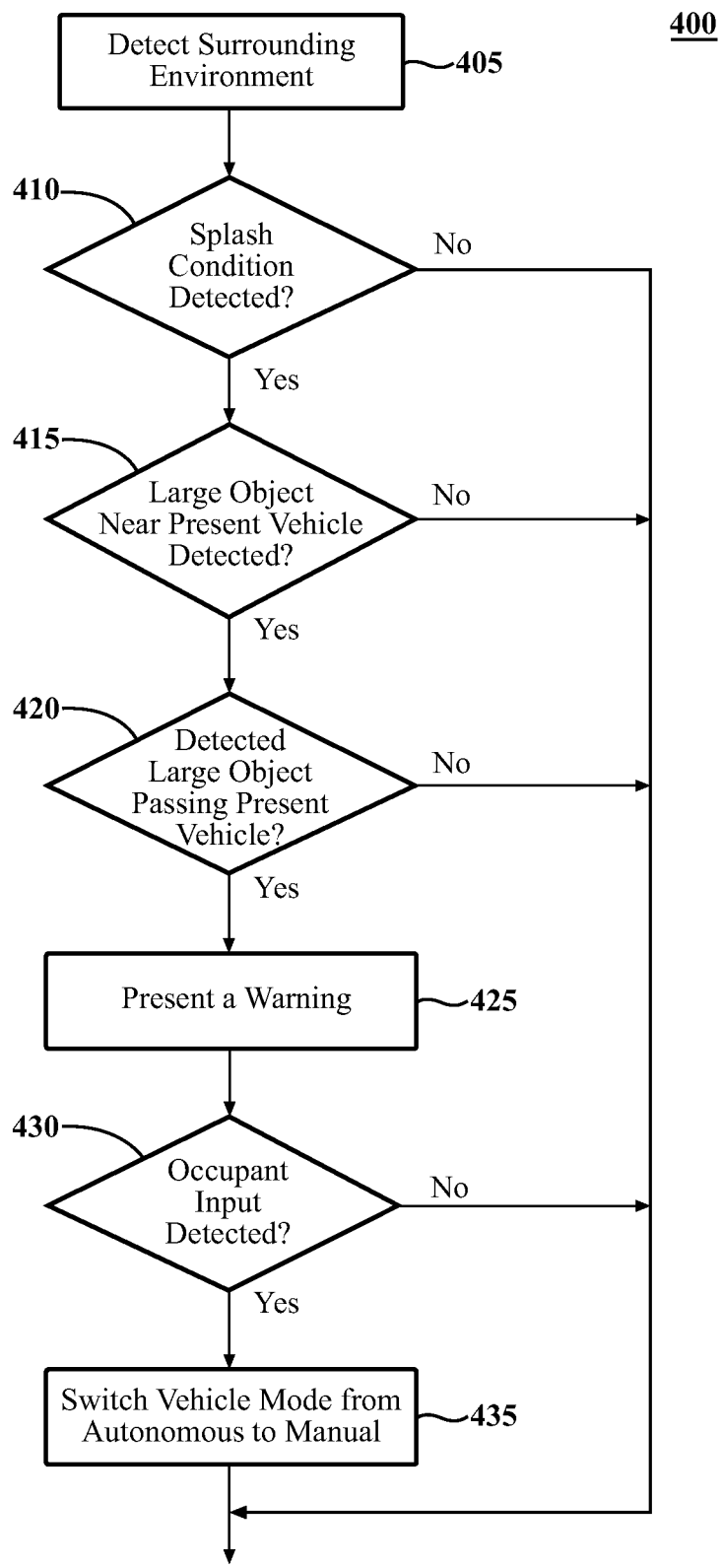
FIG. 4 is an example of a method of operating a vehicle in an environment in which a splash condition is detected.

Referring to FIG. 4, an example of a method 400 of operating a vehicle when a splash condition is detected is shown. Various possible steps of method 400 will now be described. The method 400 illustrated in FIG. 4 may be applicable to the embodiments described above in relation to FIGS. 1-3, but it is understood that the method 400 can be carried out with other suitable systems and arrangements. Moreover, the method 400 may include other steps that are not shown here, and in fact, the method 400 is not limited to including every step shown in FIG. 4. The steps that are illustrated here as part of the method 400 are not limited to this particular chronological order, either. Indeed, some of the steps may be performed in a different order than what is shown and/or at least some of the steps shown can occur simultaneously.

Various possible steps of method 400 will now be described. At block 405, the environment surrounding the vehicle can be detected. As an example, the environment surrounding the vehicle can be detected for objects (e.g. vehicles) surrounding the vehicle, splash condition(s) and other items. Such detection can be performed by one or more sensors of the sensor system 125. In some arrangements, such detecting can be performed continuously while the vehicle 100 is in operation. In some arrangements, such detecting can at any suitable interval while the vehicle 100 is in operation.

At decision block 410, it can be determined whether a splash condition is detected. Such a determination can be made using, for example, one or more of the sensors of the sensor system 125, the splash analysis module 121 and/or the processor 110. If a splash condition is not detected, the method 400 can end or return to the start. If a splash condition is detected, the method 400 can continue to decision block 415.

At decision block 415, it can be determined whether a large object is detected near the present vehicle. "Near the present vehicle" includes objects located within a predetermined distance from the present vehicle. It can include objects located within the same travel lane as the present vehicle and/or in an adjacent travel lane to the travel lane of the present vehicle. As noted above, a "large object" can be any object that has one or more dimensions that is greater than a predetermined dimension (e.g. having a detected length that is greater than the predetermined length described above) or is presumed to be large based on one or more factors (e.g. the number of wheels or tires). Such determinations can be made using, for example, one or more of the sensors of the sensor system 125, the driving module 120, the splash analysis module 121 and/or the processor 110. If a large object is not detected near the present vehicle, the method 400 can end or return to the start. If one or more large objects are detected near the present vehicle, the method 400 can continue to decision block 420.

At decision block 420, it can be determined whether one or more of the detected large objects is passing the present vehicle. Such a determination can be made using, for example, one or more of the sensors of the sensor system 125, the driving module 120, the splash analysis module 121 and/or the processor 110. As an example, the sensor system 125 can detect the presence of one or more objects. The detected object can be identified as a vehicle in any suitable manner, such as by template matching.

Whether the detected object is passing the present vehicle 100 can be determined in various ways. For instance, the sensor system 125, the driving module 120, the splash analysis module 121 and/or the processor 110 can analyze visual data captured by the camera 126 to detect the use of a turn signal by another vehicle (e.g. a vehicle located behind the present vehicle 100 and in the same travel lane). Alternatively or in addition, one or more of the sensors of the sensor system 125, the driving module 120, the splash analysis module 121 and/or the processor 110 can detect that an object is traveling in and/or has moved into a travel lane that is adjacent to the current travel lane of the present vehicle 100. One or more of the sensors of the sensor system 125, the driving module 120, the splash analysis module 121 and/or the processor 110 can detect or predict the current speed of the object in any suitable manner, such as based on a plurality of captured images of the object or by using a speed sensor. If the speed of the detected object is determined to be greater than the current speed of the present vehicle 100 and the detected object and if the present vehicle 100 are traveling in substantially the same direction, then it can be determined that the object is passing or trying to pass the present vehicle 100. For an object traveling in the opposite direction to the present vehicle 100, it can be determined that the detected object is passing the present vehicle 100 if the predicted trajectory of the object and the present vehicle 100 would result in them passing each other.

If no detected large objects are determined to be passing the present vehicle, the method 400 can end or return to the start. If one or more large objects are determined to be passing the vehicle, the method 400 can continue to block 425.

At block 425, a warning can be presented to one or more occupants of the vehicle, including the driver and/or one or more passengers. The warning can be presented in any suitable manner. For instance, the warning can be presented on a display in the vehicle. As an example, the warning can be a message presented on a display. As another example, the warning can be presented by illuminating a light, such as on an instrument panel of the vehicle. Alternatively or in addition, the warning can be presented in an audible manner. As an example, the warning can be presented over one or more in-vehicle audio channels. In such case, the audible warning can be a sound, a plurality of sounds, a word, a phrase or a message. Alternatively or in addition, the warning can be presented over any suitable in-vehicle user interface. The warning can include any suitable content.

In one or more arrangements, the warning can be sent to one or more recipients in any suitable form, such as, for example, an electronic mail message, an instant message (IM), a Short Messaging System (SMS), or a system message. The sent warning can be received on any of a variety of communication devices executing suitable communication software, such as a computer system or other information processing system. In one or more arrangements, the warning can be sent to a portable or mobile computing device, e.g., a mobile telephone, a smart phone, a wireless-enabled personal digital assistant, a portable computer, e.g., laptop, tablet or the like.

In one or more arrangements, the method 400 can include detecting whether an occupant input is received in response to the presentation of the warning at decision block 430. In some instances, one or more occupants of the vehicle (e.g. the driver or a passenger) can be prompted for an input. In other instances, the method 400 can wait to receive an occupant input. The occupant input can be received in any suitable manner. For instance, a vehicle occupant can provide an input using one or more components of the input system 130. As an example, a vehicle occupant can provide an input through a touch screen, button, switch or other in vehicle user interface element. In some arrangements, a vehicle occupant can provide an input through engagement with one or more vehicle components (e.g. gripping or turning the steering wheel, activating a turn signal, engaging a brake pedal, engaging a gas pedal, etc.). In one or more arrangements, a vehicle occupant can provide an input by speaking.

If an occupant input is not received, a default driving action can be implemented. For instance, the default driving action can be remaining in the current operational mode—autonomous mode or manual mode. In some arrangements, a predetermined amount of time can be given to allow a vehicle occupant to provide an input. The predetermined amount of time can be any suitable amount of time. In some instances, the predetermined amount of time can vary depending on one or more factors, including, for example, one or more environmental conditions. If a user input is not received within the predetermined amount of time, the default driving action can be implemented. In one or more arrangements, the default driving action can be accompanied by one or more splash mitigating actions, including, for example, automatic cleaning of one or more sensors that are or may be affected by splash, a temporary increase of frequency of windshield wiper operation, and/or other splash mitigation action.

If an occupant input is received (e.g. within the predetermined amount of time or otherwise), the method can continue to block 435. At the block 435, the vehicle can be caused to switch from an autonomous mode to a manual mode. In one or more arrangements, the processor 110, the driving module 120, and/or the splash analysis module 121 can cause the vehicle to implement the switch between the autonomous mode and the manual mode. The processor 110 and/or the driving module 120 can be operatively connected to one or more of the vehicle systems (e.g. the switching system 185) to implement the selected driving action. In one or more arrangements, the processor 110, the driving module 120, and/or the splash analysis module 121 can be operable to control the one or more actuators 140, which can control one or more of the vehicle systems 145 or portions thereof to implement the switch.

Figure 5:
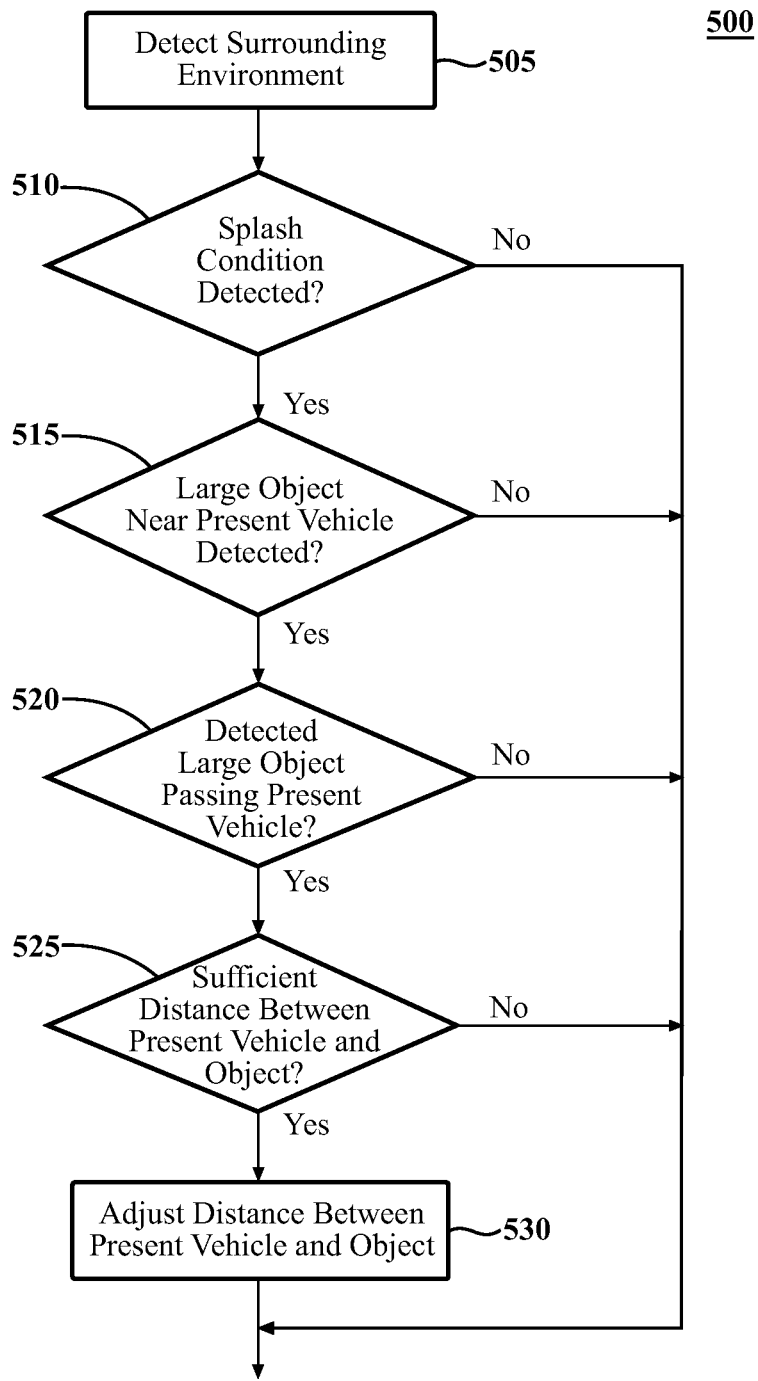
FIG. 5 is an example of a method of operating a vehicle in an environment in which a splash condition is detected.

Referring to FIG. 5, an example of a method 500 of operating a vehicle when a splash condition is detected is shown. Various possible steps of method 500 will now be described. The method 500 illustrated in FIG. 5 may be applicable to the embodiments described above in relation to FIGS. 1-3 and later in relation to FIGS. 7-10, but it is understood that the method 500 can be carried out with other suitable systems and arrangements. Moreover, the method 500 may include other steps that are not shown here, and in fact, the method 500 is not limited to including every step shown in FIG. 5. The steps that are illustrated here as part of the method 500 are not limited to this particular chronological order, either. Indeed, some of the steps may be performed in a different order than what is shown and/or at least some of the steps shown can occur simultaneously.

Various possible steps of method 500 will now be described. It should be noted that block 505, decision block 510, decision block 515, and decision block 520 in FIG. 5 are similar to block 405, decision block 410, decision block 415, and decision block 420 in FIG. 4, respectively. Accordingly the above description made with respect to these blocks and decision blocks in FIG. 4 apply equally to the respective blocks and decision blocks in FIG. 5.

At decision block 520, if one or more large objects are determined to be passing the vehicle, the method 500 can continue to decision block 525. At decision block 325, it can be determined whether there is a sufficient distance between the present vehicle and one or more of the detected objects in the travel direction to safely adjust the distance between them before the large object passes the vehicle. The detected objects can include the large object or other objects (e.g. a forward object (e.g. a forward vehicle) and/or a rearward object (e.g. a rearward vehicle)). If the distance is determined to be insufficient, the method 500 can end or return to the start. If the distance is determined to be sufficient, the method 500 can continue to block 530. A "sufficient" distance means that the distance is large enough to safely accelerate or decelerate the present vehicle with respect to another vehicle so as to adjust the distance between them.

At block 530, the distance between the vehicle and one or more of the detected objects (e.g. the passing vehicle, a forward vehicle and/or a rear vehicle) can be adjusted so as to avoid or minimize splash from the passing vehicle. If the distance is to be increased, the present vehicle can be caused to accelerate. If the distance is to be decreased, the present vehicle can be caused to decelerate. The processor 110, the driving module 120, and/or the splash analysis module 121 can be operatively connected to one or more of the vehicle systems implement the appropriate action. In one or more arrangements, the processor 110, the driving module 120, and/or the splash analysis module 121 can be operable to control the one or more actuators 140, which can control one or more of the vehicle systems 145 or portions thereof to implement the switch.

Figure 7:
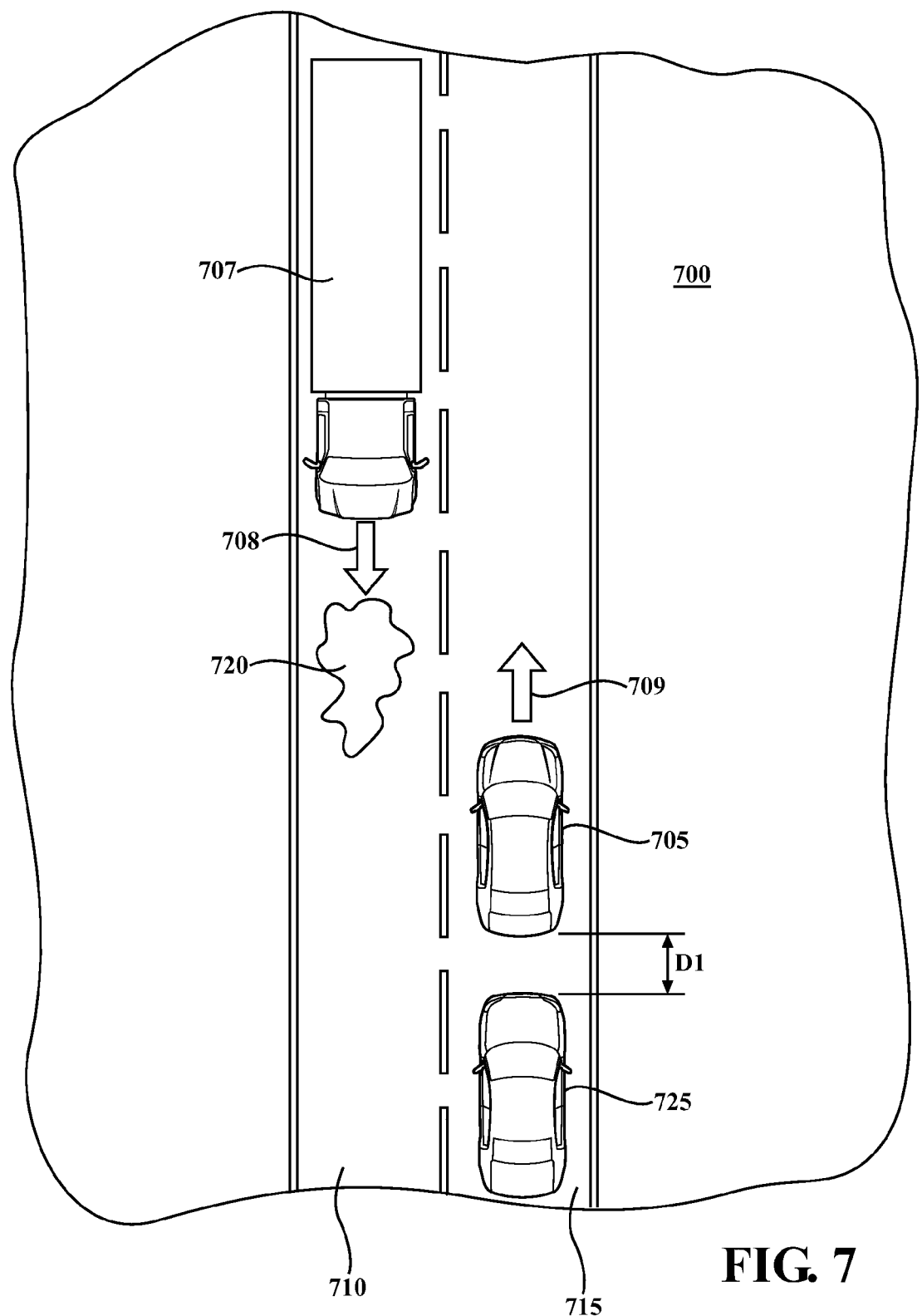
FIG. 7 is an example of a present vehicle operating in an environment in which a splash condition is detected, wherein another vehicle is passing the present vehicle in an adjacent travel lane and heading in substantially the opposite travel direction as the present vehicle and wherein a rearward vehicle is present.

FIG. 7 shows an example of an environment 700 in which the present vehicle 705 is being passed by a large object (e.g. truck 707) in an adjacent travel lane 710 to the current travel lane 715 of the present vehicle 705. The travel direction 708 of the large object can be substantially opposite to the travel direction 709 of the present vehicle 705. A splash condition 720 can be located in the adjacent travel lane 710. The present vehicle 705 can be spaced from a rearward vehicle 725 at a distance D1. If it is determined that the large object is passing the present vehicle and that the distance D1 is sufficient to safely adjust the distance between the present vehicle 705 and the rearward vehicle 725, the distance D1 can be adjusted. For instance, the present vehicle 705 can be caused to be selectively accelerated or decelerated to avoid splash caused by the large object passing through the splash condition 720.

Figure 8:
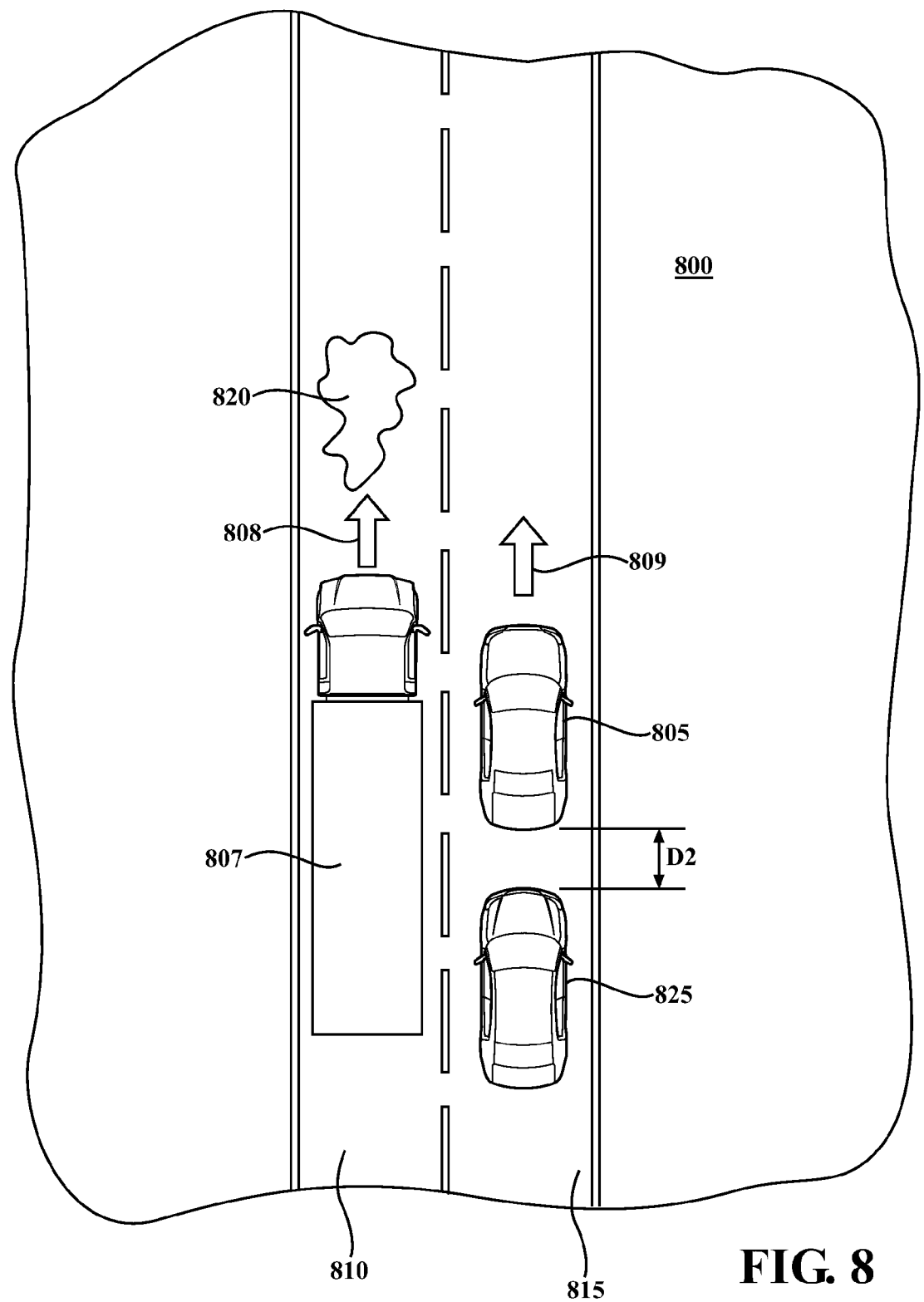
FIG. 8 is an example of a present vehicle operating in an environment in which a splash condition is detected, wherein another vehicle is passing the present vehicle in an adjacent travel lane and heading in substantially the same travel direction as the present vehicle and wherein a rearward vehicle is present.

FIG. 8 shows an example of an environment 800 in which the present vehicle 805 is being passed by a large object (e.g. truck 807) in an adjacent travel lane 810 to the current travel lane 815 of the present vehicle 805. The travel direction 808 of the large object can be substantially the same as the travel direction 809 of the present vehicle 805. A splash condition 820 can be located in the adjacent travel lane 810. The present vehicle 805 can be spaced from a rearward vehicle 825 at a distance D2. If it is determined that the large object is passing the present vehicle and that the distance D2 is sufficient to safely adjust the distance between the present vehicle 805 and the rearward vehicle 825, the distance D2 can be adjusted. For instance, the present vehicle 805 can be caused to be selectively accelerated or decelerated to avoid splash caused by the large object passing through the splash condition 820.

Figure 9:
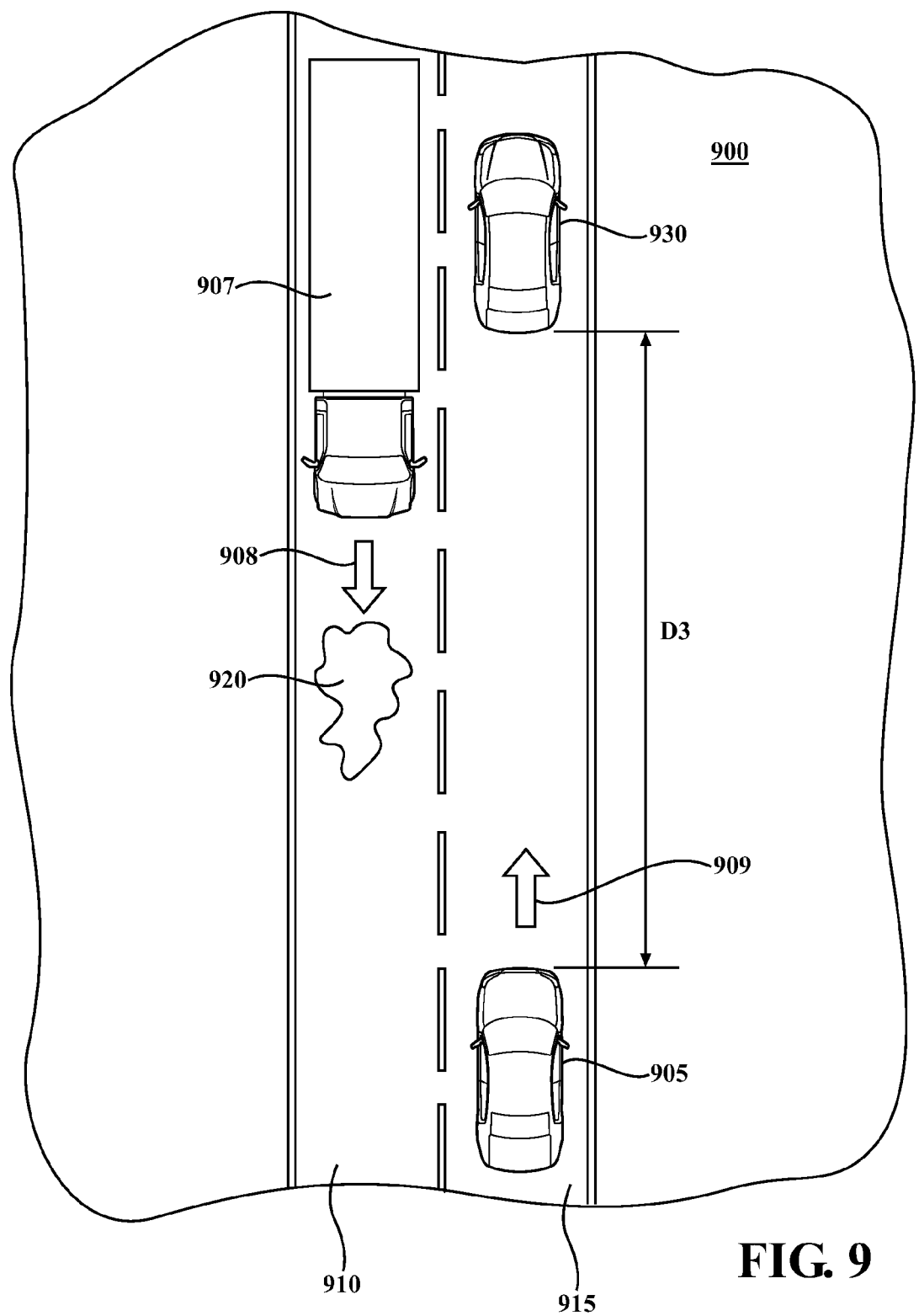
FIG. 9 is an example of a present vehicle operating in an environment in which a splash condition is detected, wherein another vehicle is passing the present vehicle in an adjacent travel lane and heading in substantially the opposite travel direction as the present vehicle and wherein a forward vehicle is present.

FIG. 9 shows an example of an environment 900 in which the present vehicle 905 is being passed by a large object (e.g. truck 907) in an adjacent travel lane 910 to the current travel lane 915 of the present vehicle 905. The travel direction 908 of the large object can be substantially opposite to the travel direction 909 of the present vehicle 905. A splash condition 920 can be located in the adjacent travel lane 910. The present vehicle 905 can be spaced from a forward vehicle 930 at a distance D3. If it is determined that the large object is passing the present vehicle and that the distance D3 is sufficient to safely adjust the distance between the present vehicle 905 and the forward vehicle 930, the distance D3 can be adjusted. For instance, the present vehicle 905 can be caused to be selectively accelerated or decelerated to avoid splash caused by the large object passing through the splash condition 920.

Figure 10:
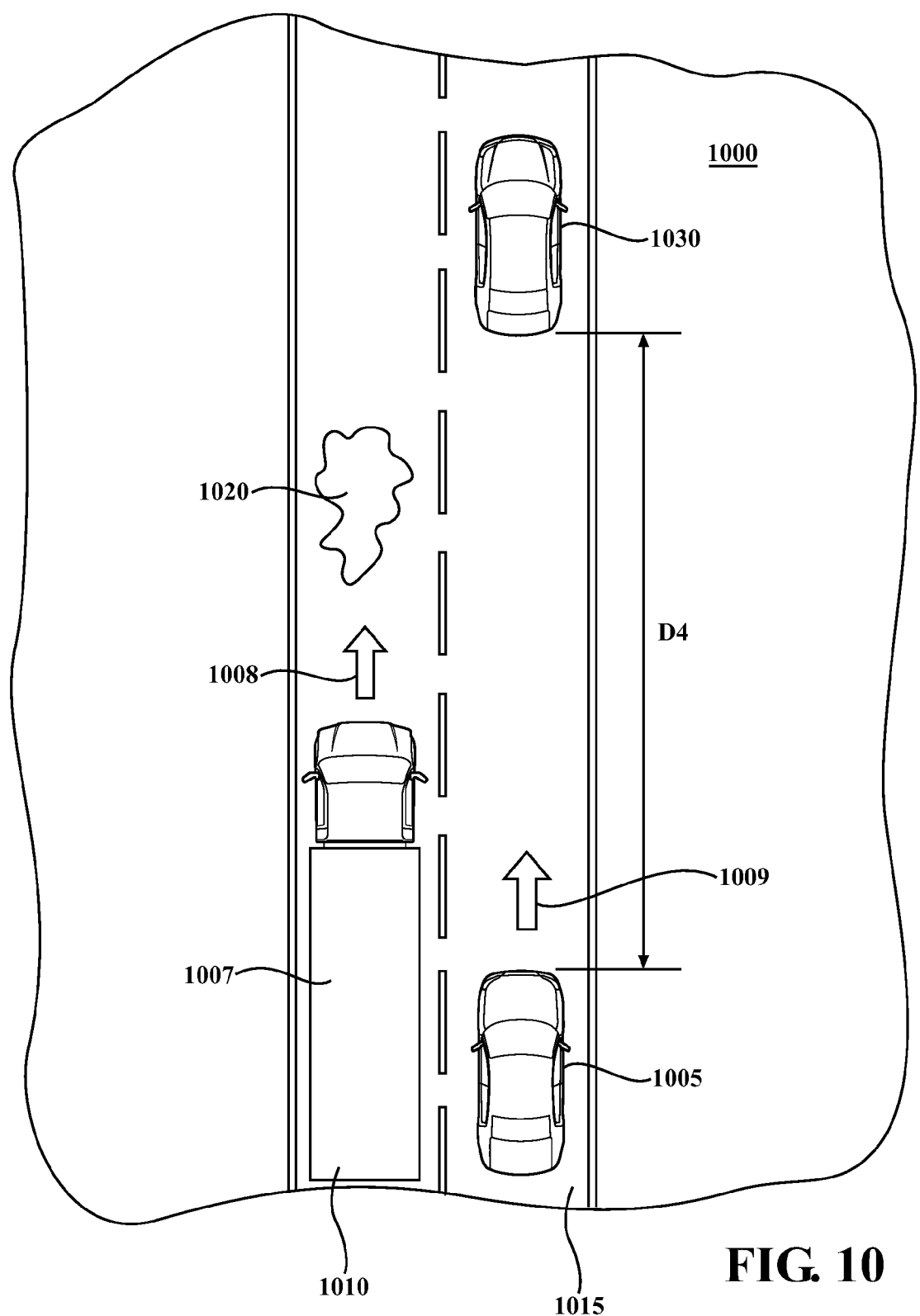
FIG. 10 is an example of a present vehicle operating in an environment in which a splash condition is present, wherein another vehicle is passing the present vehicle in an adjacent travel lane and heading in substantially the same travel direction as the present vehicle and wherein a forward vehicle is present.

FIG. 10 shows an example of an environment 1000 in which the present vehicle 1005 is being passed by a large object (e.g. truck 1007) in an adjacent travel lane 1010 to the current travel lane 1015 of the present vehicle 1005. The travel direction 1008 of the large object can be substantially the same as the travel direction 1009 of the present vehicle 1005. A splash condition 1020 can be located in the adjacent travel lane 1010. The present vehicle 1005 can be spaced from a forward vehicle 1030 at a distance D4. If it is determined that the large object is passing the present vehicle and that the distance D4 is sufficient to safely adjust the distance between the present vehicle 1005 and the forward vehicle 1030, the distance D4 can be adjusted. For instance, the present vehicle 1005 can be caused to be selectively accelerated or decelerated to avoid splash caused by the large object passing through the splash condition 1020.

Figure 6:
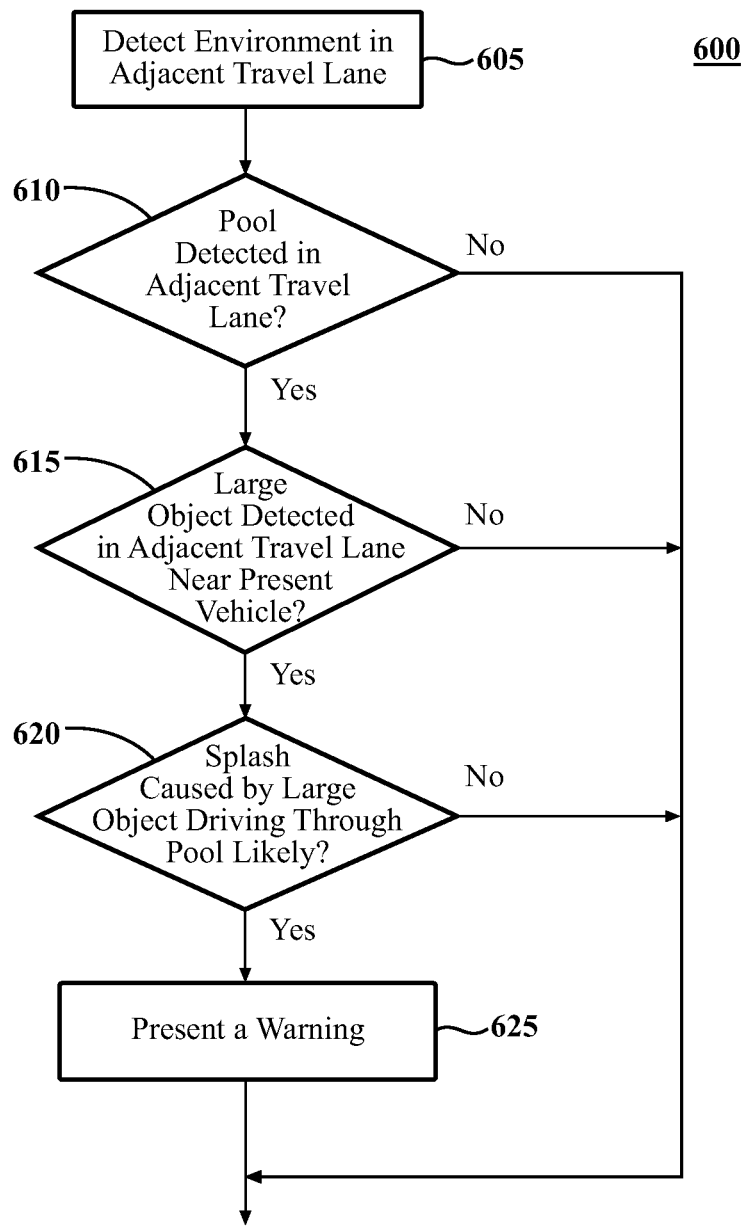
FIG. 6 is an example of a method of operating a vehicle in an environment in which a splash condition is detected.

Referring to FIG. 6, an example of a method 600 of operating a vehicle when a splash condition is detected is shown. Various possible steps of method 600 will now be described. The method 600 illustrated in FIG. 6 may be applicable to the embodiments described above in relation to FIGS. 1-3, but it is understood that the method 600 can be carried out with other suitable systems and arrangements. Moreover, the method 600 may include other steps that are not shown here, and in fact, the method 600 is not limited to including every step shown in FIG. 6. The steps that are illustrated here as part of the method 600 are not limited to this particular chronological order, either. Indeed, some of the steps may be performed in a different order than what is shown and/or at least some of the steps shown can occur simultaneously.

Various possible steps of method 600 will now be described. At block 605, the environment in an adjacent travel lane to the current travel lane of the vehicle can be detected. As an example, the adjacent travel lane can be detected for objects (e.g. vehicles) surrounding the vehicle, splash condition(s) and other items. Such detection can be performed by one or more sensors of the sensor system 125. In some arrangements, such detecting can be performed continuously while the vehicle 100 is in operation. In some arrangements, such detecting can at any suitable interval while the vehicle 100 is in operation.

At decision block 610, it can be determined whether a pool of water or other splash condition is detected in an adjacent travel lane. Such a determination can be made using, for example, one or more of the sensors of the sensor system 125, the splash analysis module 121 and/or the processor 110. If a pool of water or other splash condition is not detected in the adjacent travel lane, the method 600 can end or return to the start. If a pool of water or other splash condition is detected, the method 600 can continue to decision block 615.

At decision block 615, it can be determined whether a large object is detected in the adjacent travel lane to the present vehicle. For instance, in one or more arrangements, it can be determined whether a large object is detected in the same adjacent travel lane as the splash condition. Such a determination can be made using, for example, one or more of the sensors of the sensor system 125, the driving module 120, the splash analysis module 121 and/or the processor 110. If a large object is not detected in an adjacent travel lane, the method 600 can end or return to the start. If one or more large objects are detected in an adjacent travel lane, the method 600 can continue to decision block 620.

At decision block 620, it can be determined whether the detected large object passing through the pool of water or other splash condition will cause the present vehicle to be splashed. Such a determination can be made using, for example, one or more of the sensors of the sensor system 125, the driving module 120, the splash analysis module 121 and/or the processor 110. If it is determined that no splash will occur or that splash of the present vehicle is unlikely, the method 600 can end or return to the start. If it is determined that splash will occur or that splash of the present vehicle is likely, the method 600 can continue to block 625.

At block 625, a warning can be presented to one or more occupants of the vehicle, including the driver and/or one or more passengers. It should be noted that block 625 is similar to block 435 in FIG. 4. Accordingly the above description of block 435 applies equally to block 625.

It will be appreciated that arrangements described herein can provide numerous benefits, including one or more of the benefits mentioned herein and/or other benefits. For example, arrangements described herein can minimize or eliminate splash on the vehicle caused by a passing vehicle driving through a splash condition. Arrangements described herein can facilitate the proper functioning of the sensor system or one or more sensors thereof. Some sensors may not correctly detect one or more things regarding the surrounding environment after the vehicle is covered with splash caused by a passing vehicle. Further, some passengers may have a concern about poor visibility or even no visibility after the vehicle is covered with splash caused by another vehicle. Such concern may be worrisome when the vehicle is operating in an autonomous mode. Further, arrangements described herein can facilitate the transition between an autonomous mode and a manual mode in advance of the occurrence of potentially hazardous operational conditions. Arrangements described herein can facilitate safe driving and occupant safety.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. Examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" means A, B, C, or any combination thereof (e.g. AB, AC, BC, ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of operating a vehicle, comprising:
   detecting a splash condition in a surrounding environment of the vehicle;
   detecting an object near the vehicle;
   determining whether the detected object is passing the vehicle;
   responsive to detecting a splash condition and determining that the object is passing the vehicle, presenting a warning to an occupant of the vehicle;
   determining whether the detected object will travel through at least a portion of the splash condition;
   responsive to determining that the detected object will travel through at least a portion of splash condition, determining whether a resulting splash will contact at least a portion of the vehicle; and
   responsive to determining that the resulting splash will contact at least a portion of the vehicle, presenting a splash warning to an occupant of the vehicle.

2. The method of claim 1, wherein the vehicle is an autonomous vehicle configured to operate in an autonomous mode and a manual mode, wherein the vehicle is currently operating in the autonomous mode, and further including:
   causing the vehicle to switch from the autonomous mode to the manual mode.

3. The method of claim 2, wherein causing the vehicle to switch from the autonomous mode to the manual mode is responsive to receiving an occupant input subsequent to presenting the warning.

4. The method of claim 1, wherein the splash condition includes rain, snow, slush, sand or dust.

5. The method of claim 1, wherein the splash condition is a pool of fluid located in at least a travel lane that is adjacent to a travel lane of the vehicle, and wherein the detected object is located in the travel lane that is adjacent to the current travel lane of the vehicle.

6. The method of claim 1, wherein determining whether a resulting splash will contact at least a portion of the vehicle is based on at least one of a detected speed of the object, a detected speed of the vehicle, a detected distance between the object and the splash condition, and a detected distance between the vehicle and the splash condition.

7. A method of operating a vehicle, comprising:
   detecting a splash condition in a surrounding environment of the vehicle;
   detecting an object near the vehicle;
   determining a length of the object;
   ignoring the object if the determined length is less than a predetermined length;
   if the determined length of the object is greater than the predetermined length, determining whether the detected object is passing the vehicle; and
   responsive to detecting a splash condition and determining that the object is passing the vehicle, presenting a warning to an occupant of the vehicle.

8. The method of claim 1, wherein determining whether the object is passing the vehicle includes determining whether an object is traveling in the same direction as the vehicle or in the opposite direction as the vehicle.

9. A method of operating a vehicle, comprising:
   detecting a splash condition in a surrounding environment of the vehicle;
   detecting an object near the vehicle;

determining whether the detected object is passing the vehicle;
responsive to detecting a splash condition and determining that the object is passing the vehicle, presenting a warning to an occupant of the vehicle;
detecting a forward object traveling in the travel lane of the vehicle;
determining whether the distance between the vehicle and the forward object is sufficient; and
responsive to determining that the distance between the vehicle and the forward object is not sufficient, presenting a warning to an occupant of the vehicle.

10. A method of operating a vehicle, comprising:
detecting a splash condition in a surrounding environment of the vehicle;
detecting an object near the vehicle;
determining whether the detected object is passing the vehicle;
responsive to detecting a splash condition and determining that the object is passing the vehicle, presenting a warning to an occupant of the vehicle; and
implementing at least one of a default driving action and a splash mitigating action if an occupant input is not received within a predetermined amount of time subsequent to presenting the warning.

11. A system for a vehicle comprising:
a processor, the processor being programmed to initiate executable operations comprising:
detecting a splash condition in a surrounding environment of the vehicle;
detecting an object near the vehicle;
determining whether the detected object is passing the vehicle;
responsive to detecting a splash condition and determining that the object is passing the vehicle, presenting a warning to an occupant of the vehicle;
determine whether the object will travel through at least a portion of the splash condition;
responsive to determining that the object will travel through at least a portion of the splash condition, determine whether a resulting splash will contact at least a portion of the vehicle; and
responsive to determining that the resulting splash will contact at least a portion of the vehicle, present a splash warning to an occupant of the vehicle.

12. The system of claim 11, wherein the vehicle is an autonomous vehicle configured to operate in an autonomous mode and a manual mode, wherein the vehicle is currently operating in the autonomous mode, and the executable operations further including:
causing the vehicle to switch from the autonomous mode to the manual mode.

13. The system of claim 12, wherein causing the vehicle to switch from the autonomous mode to the manual mode is responsive to receiving an occupant input subsequent to presenting the warning.

14. The system of claim 11, wherein the splash condition includes rain, snow, slush, sand or dust.

15. The system of claim 11, wherein the splash condition is a pool of fluid is located in at least the travel lane that is adjacent to the travel lane of the vehicle.

16. The system of claim 11, wherein determining whether a resulting splash will contact at least a portion of the vehicle is based on a detected speed of the object, a detected speed of the vehicle, a detected distance between the object and the splash condition, or a detected distance between the vehicle and the splash condition.

17. The system of claim 11, wherein determining whether an object is passing the vehicle includes determining whether an object is traveling in the same direction as the vehicle or in the opposite direction as the vehicle.

18. A system for a vehicle comprising:
a processor, the processor being programmed to initiate executable operations comprising:
detecting a splash condition in a surrounding environment of the vehicle;
detecting an object near the vehicle;
determining a length of the object;
ignoring the object if the determined length is less than a predetermined length;
if the determined length of the object is greater than the predetermined length, determining whether the detected object is passing the vehicle; and
responsive to detecting a splash condition and determining that the object is passing the vehicle, presenting a warning to an occupant of the vehicle.

19. A system for a vehicle comprising:
a processor, the processor being programmed to initiate executable operations comprising:
detecting a splash condition in a surrounding environment of the vehicle;
detecting an object near the vehicle;
determining whether the detected object is passing the vehicle; and
responsive to detecting a splash condition and determining that the object is passing the vehicle, presenting a warning to an occupant of the vehicle;
detecting a forward object traveling in the travel lane of the vehicle;
determining whether the distance between the vehicle and the forward object is sufficient; and
responsive to determining that the distance between the vehicle and the forward object is not sufficient, presenting a warning to an occupant of the vehicle.

20. A system for a vehicle comprising:
a processor, the processor being programmed to initiate executable operations comprising:
detecting a splash condition in a surrounding environment of the vehicle;
detecting an object near the vehicle;
determining whether the detected object is passing the vehicle; and
responsive to detecting a splash condition and determining that the object is passing the vehicle, presenting a warning to an occupant of the vehicle; and
implementing at least one of a default driving action and a splash mitigating action if an occupant input is not received within a predetermined amount of time subsequent to presenting the warning.

* * * * *